Patented Feb. 13, 1940

2,190,021

UNITED STATES PATENT OFFICE 2,190,021

SYNTHETIC GUM AND METHOD OF COMPOUNDING SAME

George A. Hatherell, Roscoe, Calif., assignor to Frank A. Garbutt, Los Angeles, Calif.

No Drawing. Application July 2, 1937, Serial No. 151,700

11 Claims. (Cl. 99—135)

My invention has a special utility in the production of gums which are adapted to be used in the manufacture of chewing gum. Chewing gum as now produced is almost wholly of the chicle type; that is, it is produced from chicle or chicle substitutes. Chicle is a natural gum, being the coagulated sap of certain tropical trees and has properties which peculiarly fit it for use in a chewing gum. When so used it is partially purified and mixed with glucose or other sugars and flavoring extract to form the ordinary chicle-type chewing gum.

Since, however, the value of chicle as a gum base depends, in part, on its physical structure, it is impossible to entirely purify it. For example, if it is heated so as to become quite liquid, the physical structure is materially changed and its value as a chewing gum base is greatly impaired. The gum manufacturer is therefore considerably handicapped in any purification process he attempts to use and usually contents himself with removing only the larger impurities, leaving the fine particles of foreign matter in the chicle.

It is an object of my invention to produce a synthetic gum very similar, but probably superior, to chicle which is compounded from ingredients similar, but probably superior, to those found in chicle.

It is a further object of my invention to provide a process in which these ingredients may be purified before being mixed together so that they attain a high degree of purity. The physical characteristics of the ingredients are not materially altered by any such purification, it being possible to heat them and subject them to various other treatments without rendering them unsuitable for the proposed use.

It is a further object of my invention to so combine these purified ingredients that a synthetic or compounded gum will be produced which has a physical structure such that the gum has certain of the more desirable properties of chicle. By this process I produce such a compounded gum which is superior to chicle in certain characteristics and which is well suited to be used as or in a chewing gum base.

Due to the large use of chicle in chewing gum and the limited supply thereof, it has become very expensive, and gum manufacturers have been forced to use various chicle substitutes, such as jelutong, gutta kay, gutta hang kang, and other natural gums. These substitutes are inferior in nearly every way to chicle and are usually used with chicle, being, in fact, usually merely adulterants. These substitutes or adulterants, although cheaper than chicle, are, however, still quite expensive. By my process I produce a synthetic or compounded gum at cost considerably below that of any comparable mixture of natural gums.

Chicle contains two important ingredients; namely, rubber and resin. Since the term "rubber" is used to denote a natural product derived from the sap of trees and in my process a natural product need not be used, I prefer to include rubber in the larger class of "lastics". The term "lastic" is used to denote any product which has an elasticity somewhat comparable with soft rubber, but which may or may not be ordinarily classed as a rubber. I have found that excellent gums can be compounded from lastics which are distinctly rubber-like in their properties but which, nevertheless, have considerably less elasticity than rubber.

The term "resin" is used in the sense it is used by organic chemists to denote resinous materials which may or may not be natural products.

While I had known for a long time that chicle contained lastic and resin in certain proportions, many of my attempts to combine them did not result in mixtures having the physical properties of chicle. This, I believe, is due to the fact that the resins and lastics have the property when liquid, or even semi-liquid, of going into solution with each other and that a solution of lastic and resin does not have the desired properties. In chicle, I am of the opinion that the lastic forms a continuous phase in which the resin is a dispersed phase. In other words, the resin is present in the form of small dispersed particles imbedded in a matrix of lastic. I have found that if any attempt is made to combine lastic and resin by methods which will permit such solutions, an undesirable product is obtained.

It is a further object of my invention to produce a synthetic or compounded mixture of lastic and resin in which there is little or no solution of lastic and resin.

It is a further object of my invention to provide a process by which resin and lastic can be compounded mechanically to produce a compounded gum in which the resin is combined with the lastic without being in solution therewith.

Further objects and advantages will be made evident hereinafter.

In the actual practice of my invention, the lastic and resin may be first separately purified. Since their mechanical structure is relatively unimportant at the time of said purification, they can be subjected to various treatments that would materially injure chicle or the other natural gums. By this treatment any foreign matter present in the lastic or resin may be removed.

As a lastic I may use rubber latex, crepe rubber, or any of the many rubber substitutes now available.

As a resin I may use any natural or synthetic resin which is free from constituents that are soluble in water or aqueous alkaline solutions and which does not have an undesirable taste, color, or odor. I have found, however, for reasons which will hereinafter be explained, that it is desirable to use a high melting point resin; that is, a resin which does not materially liquefy at temperatures much below 90° C.

The coagulated lastic is rolled or otherwise formed into a thin sheet and the resin, preferably in powdered form, is added to this sheet during this operation. The sheet is then doubled on itself and rerolled, additional resin being added. This is continued until the desired proportion of resin has been added. The rerolling is then continued until no individual particles of resin are discernible to the eye, the resin being uniformly distributed in the form of fine particles in the lastic matrix.

While my method of mixing in the particles of resin by continued rerolling is very practical, it will be obvious to one skilled in the art that the particles of resin may be uniformly distributed in the lastic by other mechanical methods.

I have found that if the mechanical mixing of the resin into the lastic is conducted under conditions which will melt the resin that it immediately goes into solution in the rubber and the desired mechanical structure is not obtained. Considerable force must be applied to the mixture to properly distribute the resin in the lastic and this results in a rise in temperature of the lastic. This temperature may approach 90° C. without material injury to the lastic. If the mixing temperature is kept below 90° C. and a resin is used that does not melt below this temperature, the resin cannot go into solution in the rubber to any material extent.

The synthetic or compounded mass so produced has a physical structure which makes it well adapted for use in chewing gum. It is, of course, compounded with other substances to form such a chewing gum. Additional low-boiling resins, waxes, or proteins may be added and, of course, sugar and flavoring matter. It may, therefore, be used as a substitute for chicle and other natural gums now used in the manufacture of chewing gum. It is much purer than such natural gums and its properties can be controlled by a suitable proportioning of the ingredients.

It is to be understood that rubber is named in my disclosure merely as representative of the larger group for which the generic term "lastics" has been aptly suggested. The term includes numerous artificial or synthetic materials similar to natural rubber in general properties and in having molecules of the characteristic long chain structure with periodic side groups, the long chain attributing elasticity, and the side groups controlling solubility, if not elasticity as well. I have determined the suitability of some of the well-known lastics as substitutes in varying proportion for rubber and have proved the applicability of the principles of my invention thereto, some of the successful substitutes for rubber being polymerized chlorobutadiene, polymerized monoolefines from the lower petroleum fractions, polymerized 2,3-dimethylbutadiene (methyl rubber), and the reaction product of ethylene dihalide and an aromatic hydrocarbon having the general formula $RC_6H_4R_1$ where $R$ and $R_1$ each represent hydrogen or a saturated aliphatic hydrocarbon radical containing more than one carbon atom.

As an example of my employment of a lastic other than rubber, I may use in one form of my invention the polymerization product of monoolefines from the lower petroleum fractions. This particular synthetic lastic tends to cause the resultant chewing gum base to become, when masticated, progressively worn out and waxy in character, whereas natural rubber acts in the opposite manner to an undesirable extent. I have found that these opposing properties provided by this particular synthetic lastic and natural rubber may be balanced by combining the two types of lastic in the chewing gum. The exact ratio between the two lastics is a matter of taste and will vary with the quality sought. It will be apparent to those skilled in the art that by such an intermixture of natural and synthetic lastic, I modify the character of the chewing gum without dilution of the rubber content by some non-elastic modifying agent.

As further exemplifying the results of intermixing two types of lastics, I may combine with the rubber of the chewing gum base one of the compounds mentioned above as being the reaction product of ethylene dihalide and a compound of the formula $RC_6H_4R_1$. While this type of lastic is far too tough and leathery to replace all of the rubber or polymerized monoolefines in the composition, it does have a valuable modifying function when substituted for a part of the rubber content. Such substitution tends to make the finished gum start in an even manner when masticated, without a period of extreme softness, and tends to a more even release of flavor from the gum. Other results noted are increased roundness of the masticated gum and extension of the period through which the masticated gum remains even in quality. While my experiments indicate that the substitution may extend to as high as one-sixth of the lastic content, I have found that one part of this particular lastic to approximately twelve parts of other lastics is to be preferred.

As an example of an artificial lastic that may completely replace the natural rubber in my composition, I cite polymerized chlorobutadiene. I have found that in the compounding of a chewing gum base, this particular lastic has almost exactly the properties of rubber.

I have found that substitution of an artificial lastic for rubber need not affect the proportion of total lastic in the chewing gum base. Thus, in compounding a chewing gum I select a proportion for the lastic that will vary between 13% and approximately 20%, having in mind the properties that depend primarily on the relative amount of lastic in the composition. I then vary the character of the lastic content at will by substitution without changing the total quantity of lastic, thereby affecting properties in the finished product that do not depend primarily on the relative quantity of the lastic content.

My invention may be illustrated by describing its application by way of example, first, to a chewing gum of the most popular type, and, second, to a product of the bubble gum type.

In my preferred procedure, a quantity of lastic weighed out for a batch is passed through the rolls once or twice to produce a continuous sheet, and thereafter the higher melting cumarone, indene or other high melting suitable resin, powdered or broken into very small pieces, is sprinkled on the sheet every time the rubber passes through the rolls. Usually, the proper intermixture of resin and lastic to produce a homogeneous sheet is attained by fifteen or twenty minutes of milling.

By continually circulating cold water through the rolls I may conveniently keep the temperature down to 110° F. The temperature of the rolls is not critical. I have successfully practiced the process at temperatures as low as 80° F. and as high as 140° F., which temperatures are not to be understood as operative limits. It is important, however, that the temperature be substantially below the melting point of the resin to insure the resin remaining in the solidified state for the sake of the mechanical action desired. If some extremely high melting resin were developed, it would be possible to get a first-class base by rolling the resin into the rubber at a temperature of 200° F. or above.

The proportions of lastic and high melting resin to be mechanically intermixed in the manner described may be varied greatly, depending upon the properties sought in the finished base. For a base with a slight rebound; i. e., some tendency to return to the original shape when deformed, I suggest my preferred mixture of three or four parts of lastic to one part of high melting resin. For a deader product, approximately equal parts of lastic and high melting resin may be employed.

The additional ingredients to complete the chewing gum base, including the low melting resin along with modifying agents well-known in the art, may then be applied to the homogeneous sheet between further passes through the rolls, the rolls serving as a mechanical mixing means.

In the resultant chewing gum base the particles or shreds of lastic are strong, have substantially their normal "life", and form an integrated structure of adequate strength to hold in bond the particles of sugar wet with glucose. All of the undesirable properties that have bothered manufacturers of chewing gum are absent, and each of the desirable properties sought is present in the desired quality and degree. The most important achievement is the conquering of the suction property and the promotion of a relatively high lastic content.

It is to be further understood that my invention is not limited to the employment of a high melting resin in the manner described, because my discovery is that, regardless of the melting point of the resin, solution of rubber in resin is retarded when the solidified resin is mechanically forced into mixture with the rubber by rolls or other means. The term "resin" will be understood as generic, including in addition to natural resins the manufactured substitutes therefor, such as petroleum or cumarone resins.

A feature of my invention as applied to the production of a bubble-type chewing gum, as distinguished from conventional chewing gum, in addition to the fact that a high percentage of rubber is permissible, is that the ingredients may be substantially reduced from the number usually employed and the manufacturing process greatly simplified, in comparison with the prevailing practices.

The high melting cumarone is initially applied to the rubber on the rolls as previously described, and as soon as the sheet of rubber and resin becomes smooth and homogeneous, melted ingredients are introduced as before. The resultant bubble gum base is smooth and has the degree and character of toughness desired in a gum of this type. This latter mixture is compounded as before, the early step being the mechanical introduction of the solidified high melting cumarone resin into the rubber, and the later step being the addition of the remaining ingredients in melted state.

Although, for the purpose of illustrating the principles involved, I have disclosed specific steps in a specific sequence for the carrying out of my process and have recited preferred materials and proportions, it is recognized that various changes, modifications, and substitutions will occur to those conversant with the art, and I reserve the right to all such departures from my specific disclosure that properly come within the scope of my appended claims.

I claim as my invention:

1. A method of compounding a chewing gum base containing a lastic and a resin, said method being characterized by the mechanical introduction of solidified resin into the lastic.

2. A method of compounding a chewing gum base containing a lastic and a resin that includes as an early step the breaking up of the continuity of a mass of lastic by forcing finely divided resin into the lastic.

3. A method of compounding a chewing gum base that is characterized by the step of forcing comminuted resin into a mass of lastic with the temperature of the lastic below the melting point of the resin.

4. A method of compounding a chewing gum base containing a lastic and a resin, said method including the repeated passing of the lastic through rolls and the addition of solid particles of resin to the lastic between passes.

5. A method of compounding a chewing gum base containing a lastic and a resin, said method including the repeated passing of the lastic through rolls and the addition of solid particles of resin to the lastic between passes, the temperature of the rolls being kept substantially below the melting point of the resin.

6. A method of compounding a chewing gum base containing a lastic and resin, said method being characterized by the mechanical introduction of solidified resin into the lastic and the subsequent addition of melted resin.

7. A method of compounding a chewing gum base containing rubber and resin, said method being characterized by the mechanical introduction of solidified high melting resin into the rubber and the subsequent addition of low melting resin.

8. A method of compounding a chewing gum base containing a lastic and resin, said method including the repeated passing of lastic through rolls, the addition of solid particles of high melting resin to the lastic between passes, and the subsequent addition of modifying agents including low melting resin.

9. A method of compounding a chewing gum base containing lastic and a resin, said method being characterized by mechanical introduction of solidified resin into a mixture of natural and artificial lastic.

10. A method of compounding a chewing gum base containing lastic and a resin, said method including the repeated passing of an intermixture of natural and artificial lastic through rolls, and the addition of solid particles of resin to the lastic between passes, the temperature of the rolls being kept substantially below the melting point of the resin.

11. A method of compounding a chewing gum base containing lastic and resin, said method including the repeated passing of an intermixture of natural and artificial lastic through rolls, the addition of solid particles of high melting resin to the intermixture between passes, and the subsequent addition of modifying agents including low melting resin.

GEORGE A. HATHERELL.